(12) United States Patent
Apseloff

(10) Patent No.: US 6,428,449 B1
(45) Date of Patent: Aug. 6, 2002

(54) INTERACTIVE VIDEO SYSTEM RESPONSIVE TO MOTION AND VOICE COMMAND

(76) Inventor: Stanford Apseloff, 2740 W. Dublin-Granville Rd., Columbus, OH (US) 43235

(*) Notice: Subject to any disclaimer, the term of this patent is extended or adjusted under 35 U.S.C. 154(b) by 0 days.

(21) Appl. No.: 09/574,575

(22) Filed: May 17, 2000

(51) Int. Cl.[7] .............................................. A63B 24/00
(52) U.S. Cl. ................................. 482/3; 482/4; 482/902
(58) Field of Search .................................. 482/1–9, 900, 482/902, 51–54; 434/247, 267; 600/300, 481

(56) References Cited

U.S. PATENT DOCUMENTS 5,577,981 A  * 11/1996  Jarvik ............................ 482/4
6,135,951 A  * 10/2000  Richardson et al. ........ 600/300

* cited by examiner

Primary Examiner—Glenn E. Richmon
(74) Attorney, Agent, or Firm—Thomas C. Saitta

(57) ABSTRACT

An interactive video display and computer system which provides changing video images in response to a combination of signals received from repetitive body movements and voice commands. The system comprises a pace sensing apparatus which is worn on the user's body which senses the repetitive body motion, translates that motion into a signal and transmits the pace signal to a signal receiver, which translates the signal into a signal readily recognized by a computer and then delivers the signal to the computer system. The system further comprises a voice receiving mechanism for receiving voice commands and transmitting a voice signal to the computer system. The user controls the perceived rate of motion and perceived direction of travel, as well as other aspects of the video image, by pace and voice.

24 Claims, 4 Drawing Sheets

INTERACTIVE VIDEO SYSTEM RESPONSIVE TO MOTION AND VOICE COMMAND

BACKGROUND OF THE INVENTION

This invention relates generally to the field of video display systems which present a changing visual image to the user, and in particular to such systems where aspects of the video display are controlled by the user. Even more particularly, the invention relates to such systems where the video image is controllable relative to the perceived rate of motion and direction of travel within the virtual display.

Interactive video games which are controlled by players observing a video monitor and reacting to video images displayed on the monitor, or games where future video images are controlled by commands made by the player, are well known. Such games are presented on self-contained play units which operate with game program cartridges, such as the popular units sold under the brand names NINTENDO or PLAYSTATION, or on personal computers where software is provided on CD-ROMs or diskettes, or downloaded from the Internet, or where play is accomplished through remote servers on the Internet. Control or movement of the video image is accomplished by movement or actuation of mechanical controls, such as buttons on a hand-held device, a joystick, a mouse or keys on the keyboard of a computer. These interactive video games, while providing visual and mental stimulation, require that the players remain essentially stationary or sedentary. A latter generation of video games, often found in arcades, use control mechanisms which simulate actual real world control mechanisms for various scenarios. For example, a steering wheel will be used to control the perceived direction of travel of the video image in a race car video game, while a simulated gas pedal will control the perceived speed of travel. In a motorcycle race video game, the user mounts a simulated motorcycle and controls direction by leaning the motorcycle left or right. Similar systems for simulated skiing, flying, etc. provide control of the video image by body movement.

The beneficial effects of exercise are well documented. Physical exertion which includes spatial movement in outdoor settings, such as jogging, bike riding, rowing, and the like, are very popular, but many if not most participants will not undertake the activity unless there is good weather, a safe environment, daylight, etc. This issue has been addressed in certain large gyms by providing an indoor track, which allows actual movement by the participants during the activity. Where there is limited space, such as in a home, stationary exercise equipment has been developed which allows the user to perform the same motions as the outdoor activity but without any actual change of location. To replace running, biking and rowing, for example, well known equipment such as treadmills, stationary bikes and rowing machines are used. A downside to the use of such stationary equipment is that the scenery remains static, and thus long term exercise sessions can be dull and monotonous. Many users will read while exercising on stationary equipment, or televisions are set up to provide a mental distraction.

It has been found desirable to combine the positive aspects of video games with the positive aspects of physical movement or exercise in a stationary location, such that a person performing exercises is presented with a stimulated video image to reduce boredom, or such that for a person playing a video game the perceived speed of travel is controlled by sensing body movement. In addition, the combination of body movement, visual stimulation and mental stimulation can be used in educational or training games to combat boredom and short attention spans.

One approach to accomplish these goals is to provide a changing video display which is connected to and responsive to motion of a particular piece of exercise equipment. For example, U.S. Pat. No. 5,591,104 to Andrus et al., U.S. Pat. No. 6,004,243 to Ewert, and U.S. Pat. No. 6,024,675 to Kashiwaguchi all show stationary bicycles which are electronically connected to a computer and video display monitor, where the rate of perceived motion of the video image is controlled by the pedaling rate. In U.S. Pat. No. 5,240,417 to Smithson et al. and U.S. Pat. No. 5,462,503 to Benjamin et al., a stationary bike where the perceived direction of travel is controlled by leaning is shown. Similar systems can be used with rowing machines, flying machines and treadmills, such as shown in U.S. Pat. No. 5,385,519 to Hsu et al., U.S. Pat. No. 5,489,249 to Brewer et al., U.S. Pat. No. 5,562,572 to Carmein, and U.S. Pat. No. 5,584,700 to Feldman et al. More complicated virtual reality systems are also known, such as shown in U.S. Pat. No. 5,577,981 to Jarvik. While these devices are each an improvement over their respective non-video equivalents, the systems are specific to a particular piece of equipment and not interchangeable, such that the video display system for a stationary bike cannot be transferred to a treadmill or a rowing machine by the user.

Especially for home-use exercise situations, it is most desirable that the interactive changeable video image display system be responsive to body movement through sensing devices attached directly to the user rather than to the exercise equipment itself. This allows the system to be utilized with different types of equipment, or with no equipment at all, such as where the user simply runs in place. Likewise, where the interactive changeable video image display system responsive to movement is used with entertainment or educational games, it is most desirable that the system not have required hardware specific only to a single game.

An example of a system where the sensing devices are positioned directly onto the user's body is shown in U.S. Pat. No. 5,524,637 to Erickson. Erickson discloses an accelerometer connected to the user's ankle, means for wireless transmission of information from the sensor to a computer, software to interpret the information and control a video display image, and a monitor to present the image to the user. The perceived rate and direction of travel are responsive to the rate and direction of movement of the user. Erickson's invention is a device for measuring exercise—it calculates and records very specific aspects of exercise via its accelerometer. It is not a device for general, casual interaction with the computer for game play, nor does it substitute for a keyboard, mouse, joystick, steering wheel, etc., but rather is a device to perform functions and measurements that the keyboard, mouse, etc., cannot do. In contrast to Erickson's system, this invention is not a device for measuring exercise and it is in fact a device for general, casual interaction with the computer for game play and other all-purpose use, including educational use for children who are blind or deaf. The Erickson system is limited to its applicability to various exercises and particularly is limited to its applicability to various games, since the perceived direction control is responsive only to physical directional changes.

It is an object of this invention to provide an interactive video image display system which is responsive to both body motion information and verbal information, where the body motion information is used to control the perceived rate of travel through the virtual world of the video image, and where the verbal information is used to control the perceived rate of direction as well as to control an unlimited number of virtual actions within the video image which have been programmed into the operating software. Voice recognition software and the requisite equipment to accomplish this are well known in the art.

Unlike Erickson's system, the invention is not designed to monitor or measure exercise, but is a device to enable interaction with the computer via the combination of physical exertion and voice commands. The invention has uses far beyond that of the known exercise-type devices. For example, a child's software game that takes place in a virtual maze can be played with the child walking in place and telling the computer which way to turn in the maze by verbal commands. Actions such as jump, hyperspace, duck, blast off, freeze, shoot, swim, stop, go, pause, play, back, next, help, save, shift, land, walk, run, brake, fast, slow, hide, seek, etc. can be programmed to be responsive to voice commands, as well as to control manipulation of virtual options, such as go to X, pick up X, etc.

When used to enhance the home exercise experience, the system converts any simple stationary exercise equipment into a virtual reality machine, the user now being able to travel through a virtual reality world displayed on the monitor of any multimedia computer. The virtual worlds or games exist on CD-ROM or any other software storage device, or at a website accessible over the Internet, and can range from futuristic racetracks to farmlands and woods and neighborhoods to underwater worlds to mountains to intergalactic adventures to any imaginable world or landscape or setting. In each virtual world, a person can move about by exercising or body movement and voice command. The voice commands will vary with each application, with a simple system utilizing the commands "left", "right" and "back", where the first two cause perceived movement of 45 degrees to either side and the last caused perceived movement of 180 degrees or a reversal of view. Object commands such as "boat", "car", "plane", "rocket", "ladder", "bridge", "tunnel", "shovel", "drill", "sword", "rifle", etc. could provide access to vehicles and tools necessary to access certain parts of the virtual worlds in a manner well known to game players.

When used in conjunction with a child's game, the invention enables interaction with the game environment. This means that for an educational software game, the game actually combines physical activity and learning. For example, the game MazeQuest: Tales of the Wandering Grammarian, by Ohio Distinctive Software, properly adapted for use as part of this invention, would involve the child giving voice commands and walking in place to travel through the virtual maze, as well as the child practicing and learning grammar by providing voice answers to grammar questions, which could be presented in a multiple choice format. As another example, in a child's painting software program the child's movements combined with voice commands (e.g., to select colors and art tools) could enable an entirely new kind of artistic expression. Because many children have difficulty sitting still to learn, and virtually all children have attention spans which are relatively limited, an educational game that utilizes the capabilities of this invention can be an extraordinary learning device.

The invention also opens up the world of educational games to children who are blind. The invention enables interaction with the computer via a combination of body movement and voice commands such that there is no need for movement of a mouse or depression of keys responsive to visually displayed information. An educational game for blind children might be based on a virtual journey through unlit caverns, a night expedition or an Antarctic whiteout. The child would navigate based on audio clues from the game, such as the sound of footsteps on a correct stone path versus footsteps in water, mud, dense undergrowth, etc. Audio clues could be used to indicate dead ends in maze situations. Still another example could be to follow a winding stream based on the sound of the water, with splashes indicating a misstep, or a hide-and-seek game where the object is to move away from the sound of pursuers, or a nighttime sea rescue based on directional clues combined with positive and negative audio sounds (e.g., warning bells, sonar depth warnings, radio dispatches, shouts, etc.), or a nighttime tracking mission of an animal with a locator transmitting beacon. The educational component for blind children would be the same as for sighted children, that upon achieving certain goals or upon encountering certain objects or creatures in the game, the computer would ask multiple choice questions relating to math, spelling, geography, language, science, history, etc., with the child verbally responding.

For children with speech problems or other difficulties in speaking, such as with deaf children, the invention can learn to recognize the child's speech in the known manner of standard voice recognition programs. Thus the invention can be used as a speech practicing tool while the child is simultaneously having fun and learning. The instant positive reinforcement that the child would experience by the game responding to his or her voice commands would encourage the child to practice speaking.

These and other objects of the invention not particularly set forth above will be more readily apparent from the description and disclosure to follow.

SUMMARY OF THE INVENTION

The invention is an interactive video display and computer system which provides changing video images in response to a combination of signals received from repetitive body movements and voice commands. The system comprises a pace sensing means which is worn on the user's body which senses the repetitive body motion, translates that motion into a signal and transmits the pace signal to a signal receiving means, which translates the signal into a signal readily recognized by a computer and then delivers the signal to the computer system. The system further comprises a voice receiving means, which can operate in either of two ways. A first scenario is that the voice receiving means consists of both a microphone and the necessary hardware and software to translate the voice input into signals readily understood by the computer (e.g., signals identical to keyboard inputs, mouse inputs or any other generally recognized computer inputs). The voice receiving means receives the voice command, translates it into a generally recognized computer input, and then sends that input to the computer. In a second scenario, the voice receiving means contains a microphone, but the hardware and software to translate the voice into input that can be readily recognized by the computer would reside in the computer system itself. In this second scenario, the voice receiving means receives the voice command and then sends the untranslated input to the computer for translation. The advantage of the first scenario is that it is more universally accessible because it does not require that the user's computer have any particular microphone translation capabilities. The disadvantage is that the cost of the device under the first scenario is greater than the cost under the second scenario because the first scenario contains more hardware and software. The computer system receives and analyzes the pace signals and the voice signals, and in turn controls a streaming video display image presented on a monitor, such that the perceived rate of travel within the virtual world presented by the video display system is directly responsive to the frequency of the pace signal, and where the perceived direction of travel within the virtual world presented by the video display system is directly responsive to the voice signals. In other embodiments, the voice signals can be used by the software to manipulate the video display in other ways concerning the particular images presented to the user. In a basic embodiment, the pace sensing means may comprise a pendulum switch whereby a single pulse is produced for each repetitive motion, such as back-and-forth movement of an arm or leg which would result from running in place or operation of an exercise device.

DETAILED DESCRIPTION OF THE INVENTION

With reference to the drawings, the invention will now be described in detail with regard for the best mode and the preferred embodiments. In a most general sense, the invention is an interactive system for controlling a streaming or changeable video display image which is responsive to repetitive physical body movement and voice commands, the system comprising body-worn pace sensing means which transmits a pace signal to a pace signal receiving means, which in turn translates the signal and then communicates the signal to a computer system, and voice receiving means which translates and delivers a voice signal to the computer system for analysis by the software, the software then altering the video display image projected via a monitor in response to the combination of voice commands and pace relative to the perceived rate and direction of travel, or relative to the particular images presented on the monitor.

Figure 1:
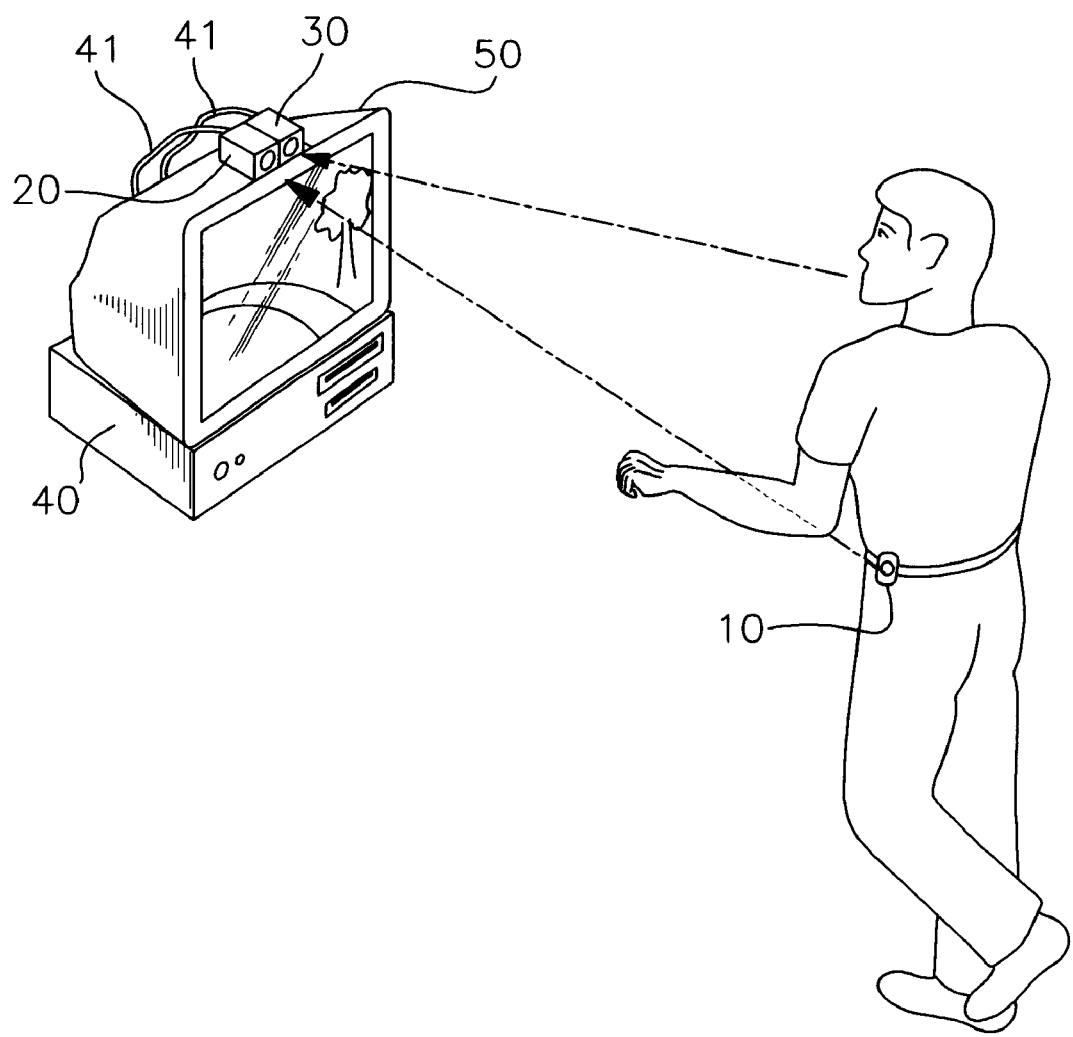
FIG. 1 is a general view of the system of the invention in use without exercise equipment.
Figure 2:
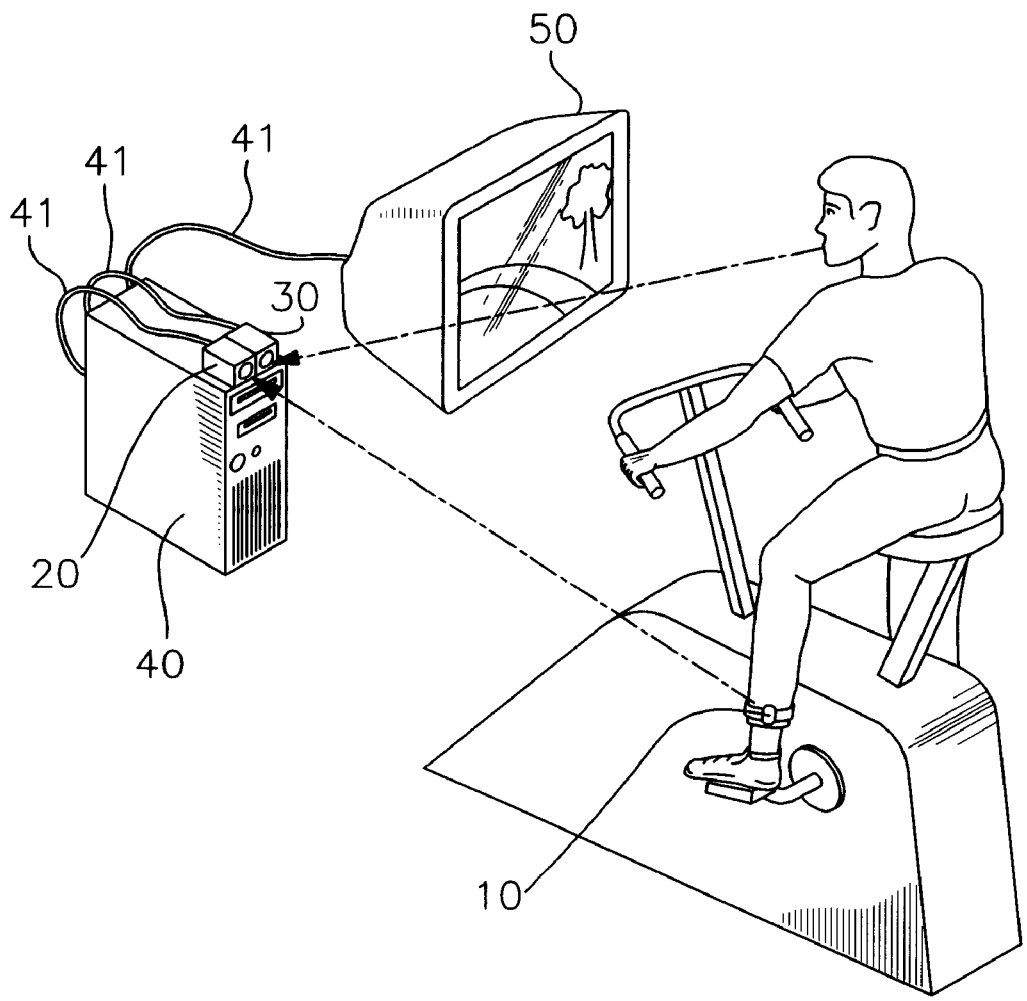
FIG. 2 is a general view of the system of the invention in use with a stationary exercise bicycle.

As shown in FIGS. 1 and 2, the system comprises a body-worn pace sensing means 10, pace signal receiving means 20, voice receiving means 30, a microprocessor unit or computer 40, and a video display monitor or screen 50. The computer 40 may be of any suitable type, such as a personal computer, capable of running software programs. Alternatively, computer 40 may be a device interlinked with a local network or by modem or cable with a global computer network system, commonly called the Internet. The monitor 50 may be of any suitable type capable of displaying video images, such as monitors commonly used with computer systems, or a television set. The computer 40 and monitor 50 are linked by standard electronic signal communication means 41, typically wiring or cable, and the computer 40 is also linked in similar manner to the pace signal receiving means 20 and the voice receiving means 30. The software required includes the programming necessary for displaying video images, for receiving and acting upon the pace signal input, and for receiving, recognizing and acting upon the voice signals. Such types of programs are well known in the art.

The pace sensing means 10 is a device which is adapted to be worn on or attached to the body or clothing of a person. The pace sensing means 10 may be attached to the user by any suitable attachment mechanism 12, such as a clip (as shown in FIG. 1), mechanical fasteners, hook-and-pile type fasteners, elastic bands or a strap (as shown in FIG. 2). The attachment mechanism 12 is preferably of a type which allows the pace sensing means 10 to be positioned at different locations on the body, such as the ankle, thigh, wrist, forearm, chest, waist, etc. This enables the pace sensing means 10 to be capable of sensing repetitive and reciprocating body motions in various settings. For example, when the device is used without exercise equipment, the pace sensing means 10 can be placed on the waist, as shown in FIG. 1, when a user is walking or running in place, or on the arm or leg when alternative movement is utilized. When the system is used with stationary exercise equipment 99, as shown in FIG. 2, the pace sensing means 10 is again worn on the most appropriate body part. For a stationary bicycle, this may be the ankle or thigh, while for a stationary rowing machine, it may be best to position the pace sensing means 10 on the chest.

Figure 4:
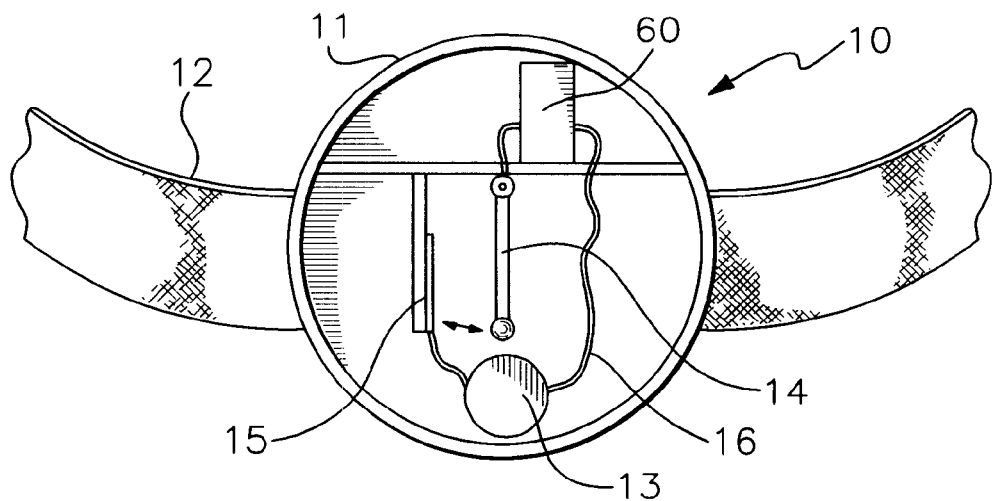
FIG. 4 is an exposed view of a simple embodiment of the pace sensing means of the invention.

The pace sensing means 10, an embodiment of which is detailed in FIG. 4, is a device which senses the wearer's repetitive motion and translates that movement into a pulsed signal, which is transmitted by pace signal transmission means 60 to the pace signal receiving means 20. While this signal could be transmitted over wires or cables, it is most preferred that the signal be transmitted in a wireless manner such as by radio waves, microwaves or infrared. Such transmission components are well known and are utilized in many common objects such as remote controls, and as such signal transmission means 60 may incorporate any of this technology. The pace sensing means 10 is powered by a battery 13, which is connected in circuit by wires 16 to the other components, and comprises any mechanism capable of producing pulsed signals in an on-off mode. In the embodiment shown in FIG. 4, the pace sensing means 10 comprises a housing 11 containing a pendulum member 14 which is mounted to be able to strike a contact plate 15 when movement of the device causes the pendulum member 14 to travel the necessary arc. Such mechanisms are found in pedometer devices, for example. This contact completes the electronic circuit such that a pulse signal is transmitted by the signal transmission means 60 to the signal receiving means 20. A new pulse signal is transmitted with each contact. The frequency of this signal corresponds to the rapidity of the movement, such that a fast movement produces a higher rate of signals per time than a slow movement.

Figure 5:
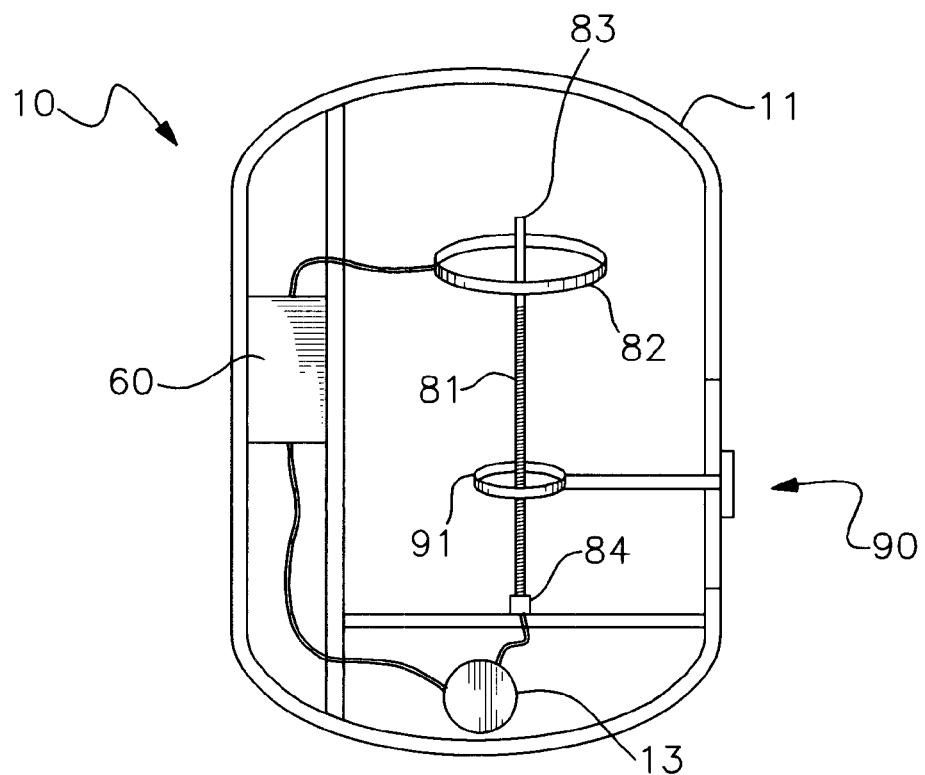
FIG. 5 is an exposed view of an alternative embodiment for the pace sensing means.

An alternative embodiment for the pace sensing means 10 is shown in FIG. 5. In this construction, a flexible member 81 such as a spring is anchored at its lower end 84 within housing 11, with the anchored end 84 of the flexible member 81 in electrical communication with a battery 13. The other end of the flexible member 81 comprises a contact member 83 which is positioned within a preferably circular contact ring member 82, which is also connected by wires 16 to the battery 13 and pace transmission means 60 in circuit, such that the gap between the contact member 83 and the contact ring 82 prevents completion of the circuit. Repetitive body movement causes the flexible member 81 to sway such that the contact member 83 contacts the contact ring 82, thereby completing the circuit and initiating transmission of a pulse pace signal. Preferably, sensitivity control means 90 are provided to allow for adjustment of the sensitivity of the pace sensing means 10, and may comprise as shown a sliding ring member 91 positionable along the axial direction of the flexible member 81 to restrict or increase the responsiveness of the flexible member 81 to movement.

The pace signal receiving means 20 is a receiver matched to correlate with the type of signal produced by the signal transmission means, whether radio, infrared, microwave or other. The discrete pulse signals are translated into input that can be readily recognized by the computer 40 and then relayed to the computer 40 over cables 41 for processing by the software. The frequency of the pace signals determines the rate of perceived travel of the video display images on the monitor 50, such that a fast pace causes a rapid change to simulate rapid movement through a landscape, while slower movement causes a correspondingly slower perceived movement through the virtual world on the monitor 50. Alternatively, the pace can be used to control other aspects of the video display as desired.

Figure 3:
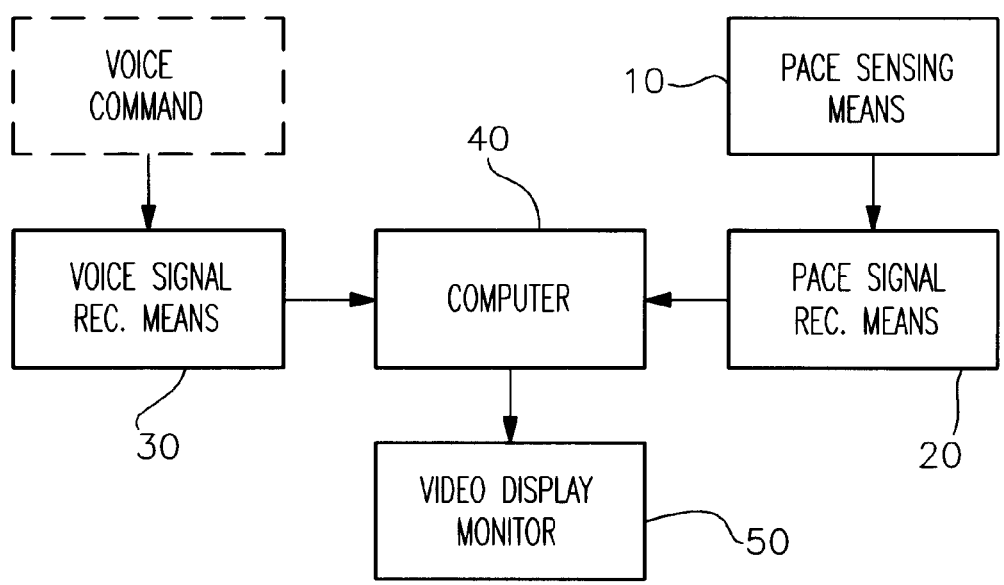
FIG. 3 is a flow chart showing the communication pathways of the invention.

The system also comprises a voice recognition aspect, where voice commands are received by voice receiving means 30, translated and transmitted to the computer 40 by cable 41. Voice recognition software, residing in either the voice receiving means 30 or in the computer 40, recognizes and distinguishes the various preprogrammed commands, such that the video images or audio output are changed in response to the particular commands. In a first embodiment, the voice receiving means 30 consists of both a microphone and the necessary hardware and software to translate the voice input into signals readily understood by the computer 40 (e.g., signals identical to keyboard inputs, mouse inputs or any other generally recognized computer inputs). The voice receiving means 30 receives the voice command, translates it is a generally recognized computer input, and then sends that input to the computer 40. In a second embodiment, the voice receiving means 30 contains a microphone, but the hardware and software to translate the voice into input that can be readily recognized by the computer 40 would reside in the computer system 40 itself. In this second embodiment, the voice receiving means 30 receives the voice command and then sends the untranslated input to the computer 40 for translation. FIG. 3 shows a diagram of the dual inputs which are delivered to and received by the computer 40, where the software processes the commands to produce changes in the video display shown on the monitor 50.

The system allows the user to perform multiple activities related to games, exercises and exercises with stationary exercise equipment, since the system is not specific to any one piece of equipment or any one type of movement activity. The system can be utilized by anyone owning a home computer and monitor, with only the pace sensing means 10, pace transmitting means 60, pace signal receiving means 20, voice command receiving means 30, and the related voice recognition and processing software needed to be brought in separately. The content of the software presented to the user, i.e., the visual images presented or interactive games, can be of infinite variety, such that the system will not become boring after a number of uses. It is contemplated that equivalents and substitutions for components set forth above may be obvious to those skilled in the art, and therefore the true scope and definition of the invention is to be as set forth in the following claims.

I claim:

1. A system for controlling a video display image in response to physical movement and voice commands, the system comprising
    pace sensing means adapted to be worn on a person's body, where said pace sensing means senses repetitive body movement and creates pulsed pace signals;
    pace signal transmission means in communication with said pace sensing means for transmitting said pace signals to a pace signal receiving means;
    pace signal receiving means for receiving said pace signals transmitted from said pace signal transmission means and for delivering said pace signals to a computer;
    voice receiving means for receiving voice signals and for delivering said voice signals as input to a computer;
    a computer for receiving and processing said pace signals as input from said pace signal receiving means and said voice signals as input from said voice receiving means, and for controlling a video display monitor and delivering video images to said video display monitor in response to said pace signals and said voice signals, wherein said video images comprise streaming video images representing perceived travel through a virtual world;
    a video display monitor in communication with said computer for displaying video images;
    wherein said pace signals and said voice signals control the presentation of the video images delivered to said video display monitor by said computer, such that said pace signals control the perceived rate of travel through said virtual world displayed on said video display monitor and said voice signals control the perceived direction of travel through said virtual world displayed on said video display monitor.

2. The system of claim 1, where said voice receiving means comprises a microphone.

3. The system of claim 2, where said voice receiving means further comprises means to translate said voice signals into input prior to delivery to said computer.

4. The system of claim 1, where said pace signal transmission means transmits said pace signals by infrared transmission.

5. The system of claim 1, where said pace signal transmission means transmits said pace signals by radio transmission.

6. The system of claim 1, where said pace signal transmission means transmits said pace signals by microwave transmission.

7. The system of claim 1, where said pace sensing means comprises a pendulum member.

8. The system of claim 1, where said pace sensing means comprises a flexible member positioned within a circular contact.

9. An interactive video system responsive to pace signals and voice signals, said interactive video system visually presenting a virtual world within which perceived motion, perceived direction of travel and perceived actions affecting virtual objects occurs, said interactive video system comprising:
    pace sensing means adapted to be worn on a person's body, where said pace sensing means senses repetitive body movement and creates pulsed pace signals;
    pace signal transmission means in communication with said pace sensing means for transmitting said pace signals to a pace signal receiving means;

pace signal receiving means for receiving said pace signals transmitted from said pace signal transmission means and for delivering said pace signals to a computer;

voice receiving means for receiving voice signals and for delivering said voice signals as input to a computer;

a computer for receiving and processing said pace signals as input from said pace signal receiving means and said voice signals as input from said voice receiving means, and for controlling a video display monitor and delivering video images to said video display monitor in response to said pace signals and said voice signals, wherein said video images comprise streaming video images representing perceived travel through a virtual world and perceived objects within said virtual world;

a video display monitor in communication with said computer for displaying said video images;

wherein said pace signals and said voice signals control the presentation of the video images delivered to said video display monitor by said computer, such that said pace signals control the perceived rate of travel through said virtual world displayed on said video display monitor and said voice signals control the perceived direction of travel through said virtual world and perceived actions affecting virtual objects displayed on said video display monitor.

10. The system of claim 9, where said voice receiving means comprises a microphone.

11. The system of claim 10, where said voice receiving means further comprises means to translate said voice signals into input prior to delivery to said computer.

12. The system of claim 9, where said pace signal transmission means transmits said pace signals by infrared transmission.

13. The system of claim 9, where said pace signal transmission means transmits said pace signals by radio transmission.

14. The system of claim 9, where said pace signal transmission means transmits said pace signals by microwave transmission.

15. The system of claim 9, where said pace sensing means comprises a pendulum member.

16. The system of claim 9, where said pace sensing means comprises a flexible member positioned within a circular contact.

17. An interactive video system responsive to pace signals and voice signals, said interactive video system visually presenting a virtual world within which perceived motion and perceived actions affecting virtual objects occurs, said interactive video system comprising:

pace sensing means adapted to be worn on a person's body, where said pace sensing means senses repetitive body movement and creates pulsed pace signals;

pace signal transmission means in communication with said pace sensing means for transmitting said pace signals to a pace signal receiving means;

pace signal receiving means for receiving said pace signals transmitted from said pace signal transmission means and for delivering said pace signals to a computer;

voice receiving means for receiving voice signals and for delivering said voice signals as input to a computer;

a computer for receiving and processing said pace signals as input from said pace signal receiving means and said voice signals as input from said voice receiving means, and for controlling a video display monitor and delivering video images to said video display monitor in response to said pace signals and said voice signals, wherein said video images comprise streaming video images representing perceived travel through a virtual world and perceived objects within said virtual world;

software operating said computer, said software interpreting said voice signals such that different voice signals produce different perceived actions affecting said virtual objects;

a video display monitor in communication with said computer for displaying said video images;

wherein said pace signals and said voice signals control the presentation of the video images delivered to said video display monitor by said computer, such that said pace signals control the perceived rate of travel through said virtual world displayed on said video display monitor and said voice signals control perceived actions affecting virtual objects displayed on said video display monitor.

18. The system of claim 17, where said voice receiving means comprises a microphone.

19. The system of claim 18, where said voice receiving means further comprises means to translate said voice signals into input prior to delivery to said computer.

20. The system of claim 17, where said pace signal transmission means transmits said pace signals by infrared transmission.

21. The system of claim 17, where said pace signal transmission means transmits said pace signals by radio transmission.

22. The system of claim 17, where said pace signal transmission means transmits said pace signals by microwave transmission.

23. The system of claim 17, where said pace sensing means comprises a pendulum member.

24. The system of claim 17, where said pace sensing means comprises a flexible member positioned within a circular contact.

* * * * *